APPARATUS FOR SPRAYING AND/OR DISPENSING LIQUID

Original Filed Jan. 20, 1958 6 Sheets-Sheet 1

INVENTOR.
GENEVIEVE I. MAGNUSON
EXECUTRIX OF THE ESTATE
ROY M. MAGNUSON, DECEASED

BY Allen & Chromy
ATTORNEYS

APPARATUS FOR SPRAYING AND/OR DISPENSING LIQUID
Original Filed Jan. 20, 1958 6 Sheets-Sheet 2
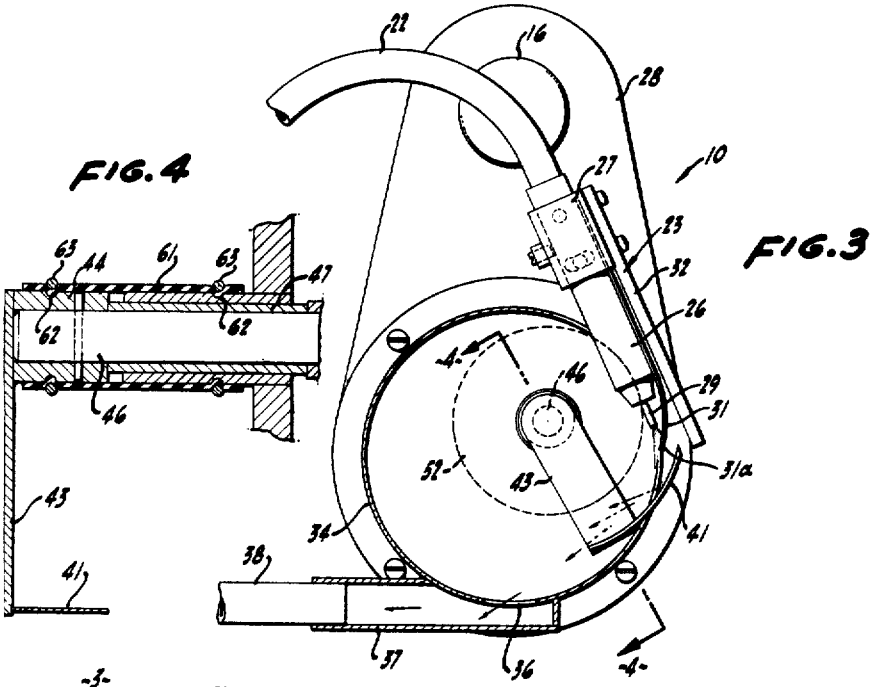
FIG. 3
FIG. 4
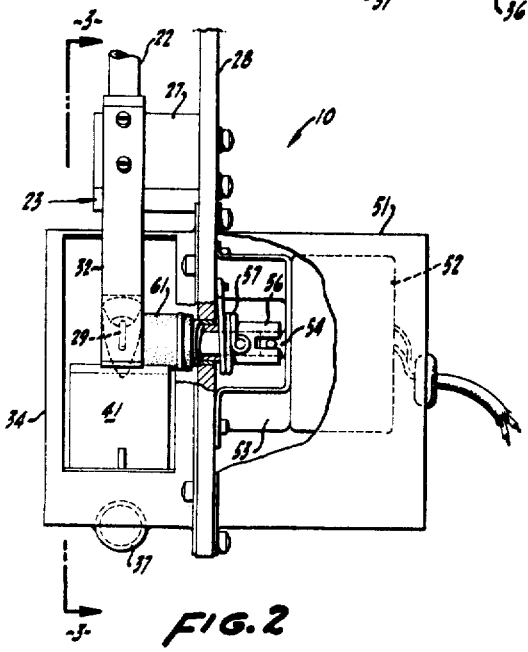
FIG. 2
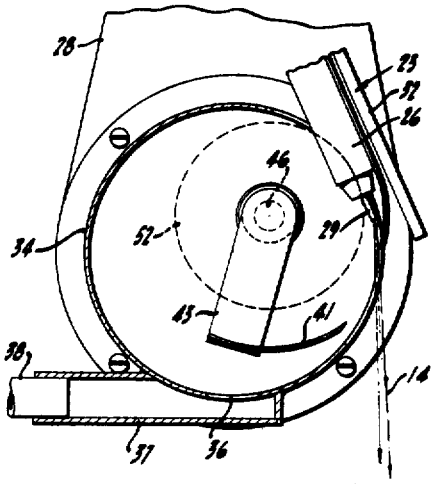
FIG. 5
INVENTOR.
GENEVIEVE I. MAGNUSON
EXECUTRIX OF THE ESTATE
ROY M. MAGNUSON, DECEASED
BY Allen & Chaney
ATTORNEYS APPARATUS FOR SPRAYING AND/OR DISPENSING LIQUID
Original Filed Jan. 20, 1958 6 Sheets-Sheet 3
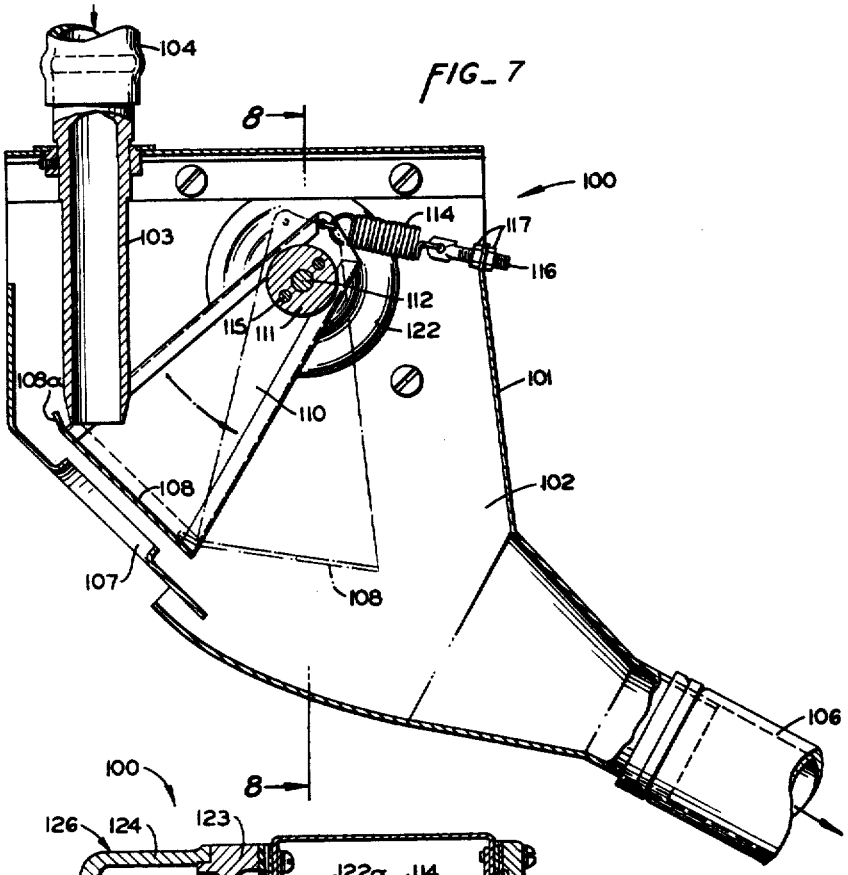
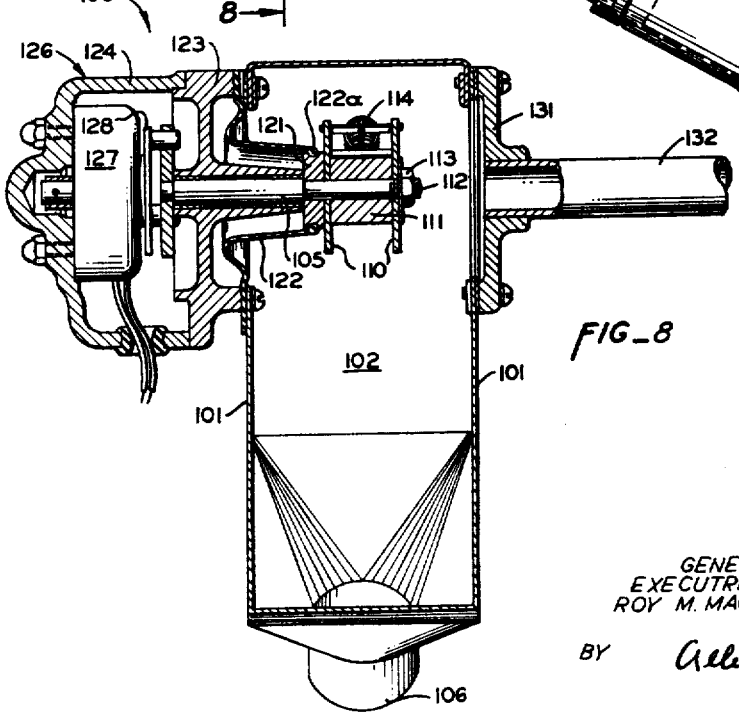
FIG_8
INVENTOR
GENEVIEVE I. MAGNUSON
EXECUTRIX OF THE ESTATE
ROY M. MAGNUSON, DECEASED
BY Allen & Chaney
ATTORNEYS

APPARATUS FOR SPRAYING AND/OR DISPENSING LIQUID

Original Filed Jan. 20, 1958 6 Sheets-Sheet 4

INVENTOR.
GENEVIEVE I. MAGNUSON
EXECUTRIX OF THE ESTATE
ROY M. MAGNUSON, DECEASED

BY Allen & Hoomy

ATTORNEYS

APPARATUS FOR SPRAYING AND/OR DISPENSING LIQUID

Original Filed Jan. 20, 1958 6 Sheets-Sheet 5

INVENTOR.
GENEVIEVE I. MAGNUSON
EXECUTRIX OF THE ESTATE
ROY M. MAGNUSON, DECEASED

BY Allen & Ormsby

ATTORNEYS

APPARATUS FOR SPRAYING AND/OR DISPENSING LIQUID

Original Filed Jan. 20, 1958 6 Sheets-Sheet 6

INVENTOR
GENEVIEVE I. MAGNUSON
EXECUTRIX OF THE ESTATE OF
ROY M. MAGNUSON, DECEASED.
BY Allen & Chromy
ATTORNEYS United States Patent Office Re. 25,511
Reissued Jan. 7, 1964

25,511
APPARATUS FOR SPRAYING AND/OR DISPENSING LIQUID

Roy M. Magnuson, deceased, late of Saratoga, Calif., by Morton Salt Company, assignee, Chicago, Ill., a corporation of Delaware Original No. 2,982,319, dated May 2, 1961, Ser. No. 710,083, Jan. 20, 1958. Application for reissue Mar. 29, 1963, Ser. No. 277,970
19 Claims. (Cl. 141—160)

Matter enclosed in heavy brackets [ ] appears in the original patent but forms no part of this reissue specification; matter printed in italics indicates the additions made by reissue.

This application is a continuation-in-part of the copending application of Roy M. Magnuson, Serial No. 374,173, filed August 14, 1953, and entitled "Method and Apparatus for Spraying Treating Liquid," now abandoned, and of the copending application of Roy M. Magnuson, Serial No. 594,651, filed June 28, 1956, and entitled "Method and Apparatus for Spraying and/or Dispensing Liquid," *now Patent No. 2,992,928, issued July 18, 1961.*

The present invention relates to the dispensing of measured amounts of liquid into a container wherein the liquid is either used for treating a product at a liquid dispensing station with a selected amount of liquid or is used to place a predetermined fill into a container such as a can. The invention is concerned more particularly with an improved apparatus of the above character which is automatic in operation and fast and reliable in use. It is an object of the invention to provide an improved apparatus for dispening measured quantities of liquid into a package or container.

It is another object of the invention to provide an improved apparatus for spraying a selected amount of treating liquid onto the product, by utilizing a constantly available spray of the liquid and by intermittently releasing the spray onto the product.

It is a further object of the invention to provide improved apparatus of the above character in which open packages of the products to be treated are carried by a spray station to receive the selected amount of treating liquid.

It is another object of the invention to provide apparatus of the character described in which the spray is desirably fan-shaped and the intermittent release is effected by substantially drip-proof cutoff mechanism.

Still another object of the invention is to provide apparatus of the above character by which a relatively minute amount of liquid can be dispensed with accuracy.

A further object of the invention is to provide an apparatus for carrying out a liquid filling operation in which the liquid is circulated as a stream having constant volume and velocity, this stream being passed through an air gap at one portion of its circulating path, and being released while in this air gap for discharge or spraying into a package or container for the desired amount of time to give an accurate fill.

The above and other objects and advantages of the invention will be apparent from the following description of certain preferred apparatus, taken in conjunction with the accompanying drawings, in which:

FIGURE 2 is an elevational view, partly in section, of the spray head of the apparatus.

FIGURE 3 is a transverse sectional view of the spray head of the apparatus taken in a plane indicated by the line 3—3 in FIGURE 2.

FIGURE 4 is a fragmentary sectional view through the cut-off plate and its mounting taken as indicated by the line 4—4 in FIGURE 3.

FIGURE 5 is a view similar to FIGURE 3, but showing the spray head in active spraying condition.

FIGURE 7 is a sectional view of a modified form of filling or dispensing head.

FIGURE 8 is a sectional view of the filling head shown in FIGURE 7, being taken in a plane indicated by the line 8—8 in FIGURE 7.

As previously stated, the present invention is concerned with a novel form of liquid measuring apparatus for dispensing purposes in which the liquid is circulated in a substantially closed path providing a stream of constant volume and constant velocity so that by discharging or diverting this stream for a selected period of time, a measurement of a desired amount of liquid can be made accurately. This type of dispensing operation is useful in filling measured amounts of liquids into containers as found, for example, in the canning industry, and is also equally useful in many fields of industry where it is desirable to treat a selected group of products with a liquid treating agent for various purposes. For example, in the food industry, it is desirable to treat certain food products with a flavor accentuating agent as monosodium glutamate, and it is highly desirable that exactly the right amount of liquid be delivered to a package of the product so as to treat the product uniformly without producing excess liquid in the package, and with a minimum loss of the liquid outside the package.

The present apparatus is concerned with this treatment of products; for example, in the food industry, and comprises generally a means for circulating liquid under pressure, incorporating a constantly operating spray which is normally by-passed back into the liquid supply. When a package is in position to receive the spray, the by-passing of the spray is interrupted, and a desired amount of liquid is sprayed into the package. The interruption of the by-passing of the liquid so that feeding of liquid occurs may be carried out in response to package control so that irregularly spaced packages may be carried past the spraying station, or it may be carried out in cyclic fashion with evenly spaced packages.

Figure 1:
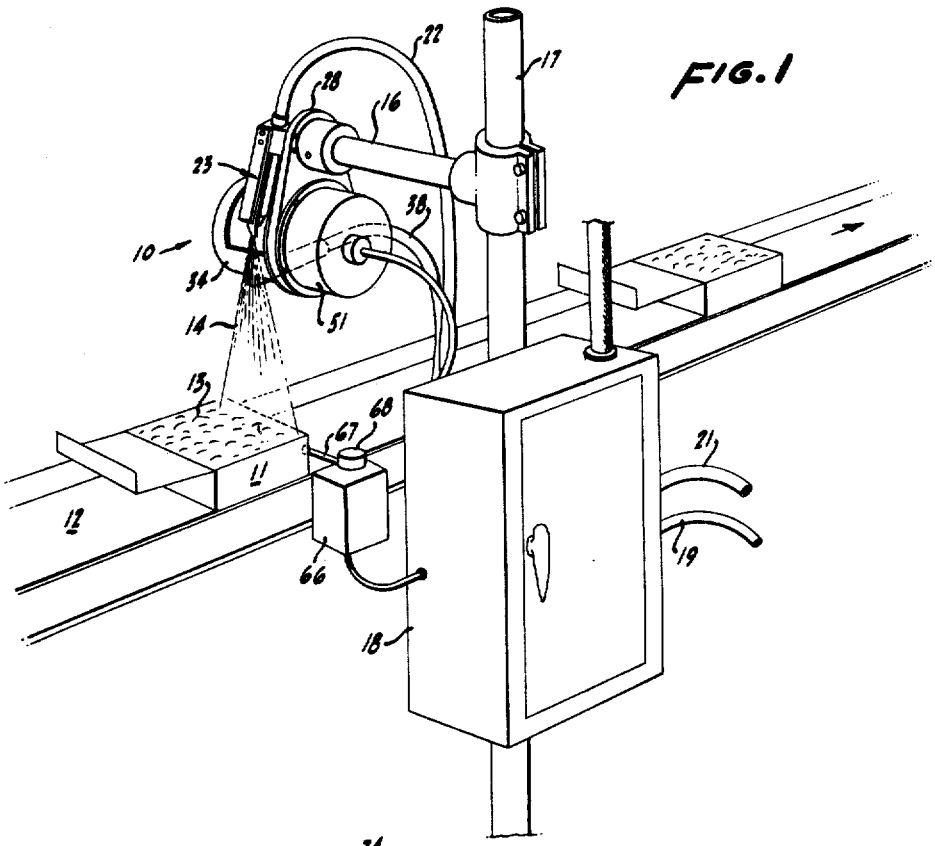
FIGURE 1 is a schematic perspective view of one form of apparatus for carrying out the invention.

The preferred form of the invention, as illustrated in FIGURE 1 for example, is responsive to the presence of an open package into which a spray is dispensed and includes generally a spray head 10 past which a series of packages 11 are carried by a suitable conveyor 12. The packages 11 are open to expose the product 13 to a divergent or fan-shaped spray 14, which is of a desired width with respect to the width of the package, and the spray 14 is maintained for a period of time with relation to the speed of travel of the package to obtain substantially complete coverage of the product 13 within the package 11. The spray head 10 for example, may be carried on an arm 16 secured on a suitable support post 17. The support post 17 may also carry a suitable housing or cabinet 18 for certain conventional parts, including a motor, a pump and various control elements of the system. A suitable suction line or conduit 19 may extend from the pump to a source of liquid not shown, and a suitable by-pass line 21 may extend from the pump to this source. Incorporated in the by-pass line 21 is a feed line 22 leading to a nozzle structure 23 from which the fan-shaped spray 14 is obtained.

The nozzle structure 23 (FIGURES 2 and 3) comprises a cylindrical body 26 which is secured by a mounting block 27 on a center support plate 28 of the spray head 10, and a projecting tubular nozzle member 29 through which the liquid is ejected. A spray plate 31 is mounted on the block 27 in any convenient manner, with a backing member 32, and has its lower end curved at 31a to intercept the liquid stream from the nozzle 29 and to change its character to a fan-shaped spray which will extend transversely to the direction of travel of the package. The nozzle structure 23 is positioned in a cut-out portion or opening 33 of a cylindrical or cup-shaped housing 34 suitably secured to the side of the plate 28 and forming a liquid collecting chamber 35. The chamber 35 has a bottom opening 36 through which liquid is drained through a tubular attachment 37 to a return line 38 communicating with the by-pass line or conduit 21 for return to the source of liquid.

Means are provided for normally directing the spray from the nozzle structure 23 into the chamber 35, and this means takes the form of an interceptor or cut-off plate 41 having a knife edge 42 at its upper end. The interceptor plate 41 is of arcuate shape and is soldered or otherwise secured to the lower end of an actuating arm 43 having a hub 44 pinned to an actuating shaft 46. The actuating shaft 46 is journaled in a bearing 47 secured in the support plate 28 and extends into a second cup-shaped housing member 51, also secured on the plate 28 in opposed relation to the housing 34. The housing 51 encloses an actuating solenoid 52 of a conventional rotary type carried by a mounting bracket 53. The operating shaft 54 of the armature of the solenoid has a pin and slot connection with a collar 56 pinned to the actuating shaft 46. A torsion spring 57 is connected between the collar 56 and the plate 28 to aid in fast return of the armature.

Within the housing member 34 a seal is provided about the actuating shaft 46 (FIGURE 4) and this seal is in the form of a rubber sleeve 61 engaging over the hub 44 and the bearing 47 for the shaft 46. The hub 44 and the bearing 47 have respective annular grooves 62 into which the rubber sleeve 61 is compressed by suitable spring wire clips 63. In this way the chamber within the housing 34 is sealed against leakage of fluid into the housing 51 containing the rotary solenoid 52.

Operation of the rotary solenoid 52 is controlled by a suitable control switch mounted in a housing 66 attached to the frame of the conveyor 12. A switch arm 67 is positioned to be moved by a package 11 and is pivotally mounted at 68 on the housing 66 so as to operate the switch therein and complete the circuit for the solenoid 52.

Figure 6:
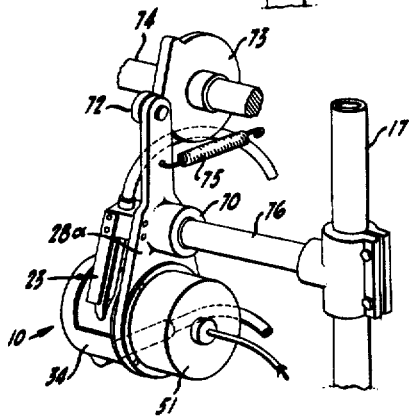
FIGURE 6 is a fragmentary perspective view of a modified form of the invention.

Referring to FIGURE 6, a modified form of the invention is shown in which the spray head is mounted for oscillating movement so as to be able to follow the travel of a package therepast. In this modification, the structure is identical with that disclosed in connection with FIGURES 1 through 5 except where differences are described.

Referring to FIGURE 6, the spray head structure includes a center plate 28a having a boss 70 journaled on the post 76. The plate 28a has upwardly projecting cam follower arm 71 carrying a roller 72 engaged with a cam 73 under the influence of a spring 75. The cam 73 is carried by a shaft 74 which may be mounted in a suitable fashion and driven synchronously with the travel of packages along the conveyor 12 so as to oscillate the spray head to follow the package while the spray is being injected into the product, and then to allow immediate return of the spray head to the starting position for cooperation with the next succeeding package. The shaft 74 may be driven from a suitable clutch drive in time with the travel of the packages. If an irregular spacing of the packages will be obtained, the shaft 74 may be driven by a rotary solenoid similar to the solenoid 52 and operated simultaneously therewith by the switch arm 67, as described in connection with the solenoid 52.

In operation the packages of product, such as vegetables for example, are placed on the conveyor 12 and the pumping system for the nozzle structure is set in operation, so that the nozzle structure 23 is constantly delivering a spray which is interrupted by the deflector plate 41 and returned to the chamber 34 and through the conduits 37 and 38 to the source of supply. With the conveyor 12 in operation, a package 11 in spraying position operates the switch arm 67 (FIGURE 1) to close the circuit for the solenoid 52. The solenoid 52 operates in a rapid fashion to move the deflector plate 41 from the position shown in FIGURE 3 to the open position shown in FIGURE 5 when the spray is delivered to the products 13, as illustrated for example in FIGURE 1. When another shape of spray is desirable, the spray plate 31 is omitted. Also, the shape of nozzle 29 may be varied.

During the travel of the package past the spray, the desired amount of liquid for treatment of the product in the package is placed therein in a substantially uniform manner so that all of the product is treated, a suitable timing means being provided for controlling the rotary solenoid. The amount of liquid dispensed can be controlled accurately within relatively minute amounts of liquid, for example, from 0.5 milliliter to 5.0 milliliters. At the end of the spray interval, the deflector plate 41 is returned rapidly to its closed position, or deflecting position, as shown in FIGURE 3 and a sharp cut-off of the liquid spray is obtained.

It will be noted that any drip collecting on the outer surface of the deflector plate 41 will run down the outside surface of this deflector plate and into the housing 34, and any liquid collecting on the inner surface of the deflector plate will run down the inner surface into the housing 34, as shown in FIGURE 3, as the lower end of the deflector plate 41 is disposed inside of the housing 34.

The operation of the form of the invention shown in FIGURE 6 is the same as that described in connection with FIGURES 1 through 5 except that the spray head is moved to travel with a package moving therepast.

As a specific example of the use of the above apparatus, an aqueous solution containing between about 5% and about 35% of dissolved monosodium glutamate, preferably containing about 15% of monosodium glutamate was used as the spraying liquid 14 in processing cut green beans in packages preparatory to quick freezing the product. The frozen product upon thawing and cooking in conventional manner possessed enhanced flavor characteristics as compared with the same product processed in the same way but which had not been treated with monosodium glutamate solution.

Other edible solutions, usually aqueous solutions, containing salt alone (15–35%), containing mixtures of salt (20%) and monosodium glutamate (15%) or containing any other or any further added dissolved substances conventionally added to foods such as fruits, seafood, meats, and vegetables may also be used as the liquid dispensed in the herein described novel apparatus. For example, the fluid dispensing device may be used for the addition of liquid sugar to those fruits to which sugar or sugar syrups are conventionally added preparatory to quick freezing the fruits.

Additionally, the novel dispensing device may be employed for adding these same types of liquids to vegetables and fruits which are being processed by canning techniques instead of by quick freezing techniques. In this instance, however, spray plate 31 having the lower end curved at 31a is reshaped, or readjusted to avoid giving a fan-shaped character to the spray. Instead the width of the ejected liquid stream is adjusted to give a stream no wider than the width or diameter of the container into which the stream is being ejected.

Referring to FIGURES 7, 8, 9 and 10, the modifications of the invention therein shown are adapted to the volumetric filling of containers, or the placing of a measured amount of liquid into containers as referred to above. Referring particularly to FIGURES 7 and 8, a dispensing head 100 is shown including a sheet metal housing 101 forming a chamber 102 into which liquid is introduced through a pipe or nozzle 103 from a conduit 104, the liquid being discharged freely through the air at the mouth of the pipe 103 to impinge upon and be directed by an interceptor or cut-off plate 108 which directs the liquid to a return conduit 106 for the liquid, in the manner previously described. The housing 101 has an outlet opening 107 which is normally closed by the interceptor or cut-off plate 108, which is similar to the plate 41 previously described.

The interceptor plate 108 is constructed as a part of a U-shaped sheet metal part including side portions 110 and which at their upper ends are secured at either side of a spacing sleeve 111 which, together with a washer 121, are secured to the reduced end 112 of a shaft 105 by a nut 113. Suitable pins 115 (FIGURE 7) connect sleeve 111 and the side portions 110 for rotation together. At its upper end the interceptor plate 108 has an inclined lip 108a which leads in the direction of interception of the stream of liquid. A spring 114 tensioned between one of the side portions 110 and a threaded stud 116 adjustably secured in a wall of the housing 101 by lock nuts 117. Also clamped in place with the sleeve 111 as described above is the spacer washer 121 which has a peripheral groove to receive the inner ring-like end 122a of a rubber boot or seal 122 which has its outer peripheral edge clamped between the housing 101, and a mounting casting 123 for a housing 124 for a conventional rotary solenoid 126 suitably mounted in the housing 124. The solenoid 126 has its armature 127 connected to a disc 128 on the oscillating drive shaft 105.

Figure 9:
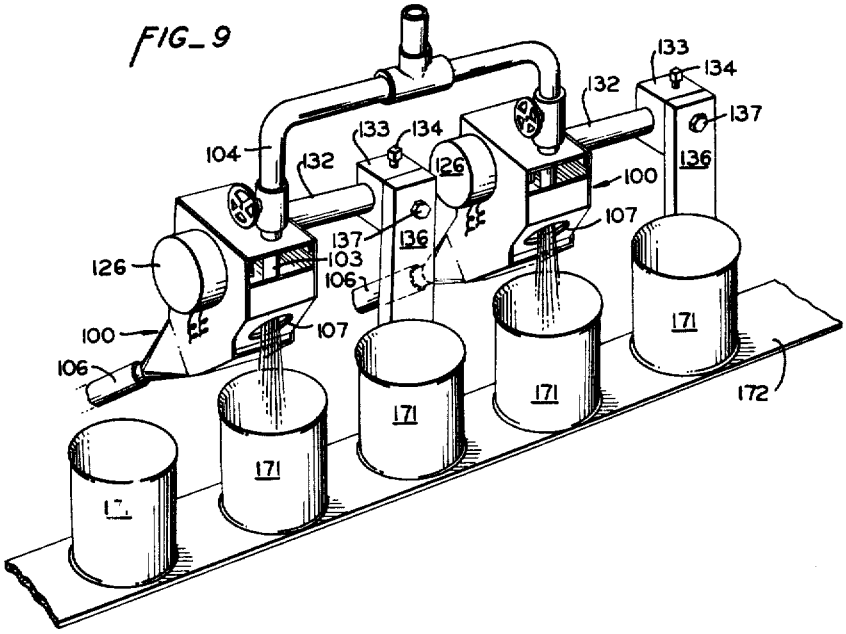
FIGURE 9 is a schematic perspective view illustrating one form of installation employing the filling or dispensing head disclosed herein.
Figure 10:
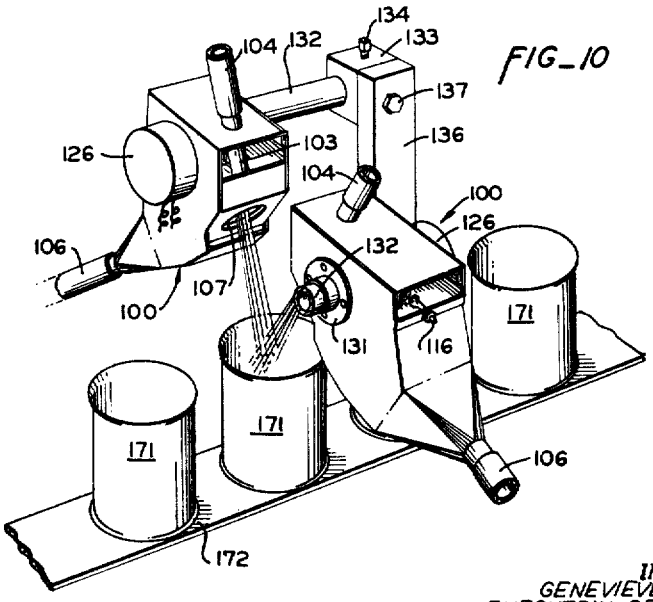
FIGURE 10 is a schematic perspective view illustrating another type of installation.

For mounting the dispensing head 100 and enabling angular adjustment thereof for directing the dispensed or sprayed liquid in a desired manner, the housing 101 has secured thereto a coupling flange 131 (FIGURE 8) in which an end of a pipe 132 may be secured by press fitting. As seen in FIGURES 9 and 10 the pipe 132 is received in an apertured block 133 in which it may be positively located in a desired angular adjustment by a set screw 134, the block 133 being secured on a suitable mounting post 136 by a cap screw 137.

Figure 11:
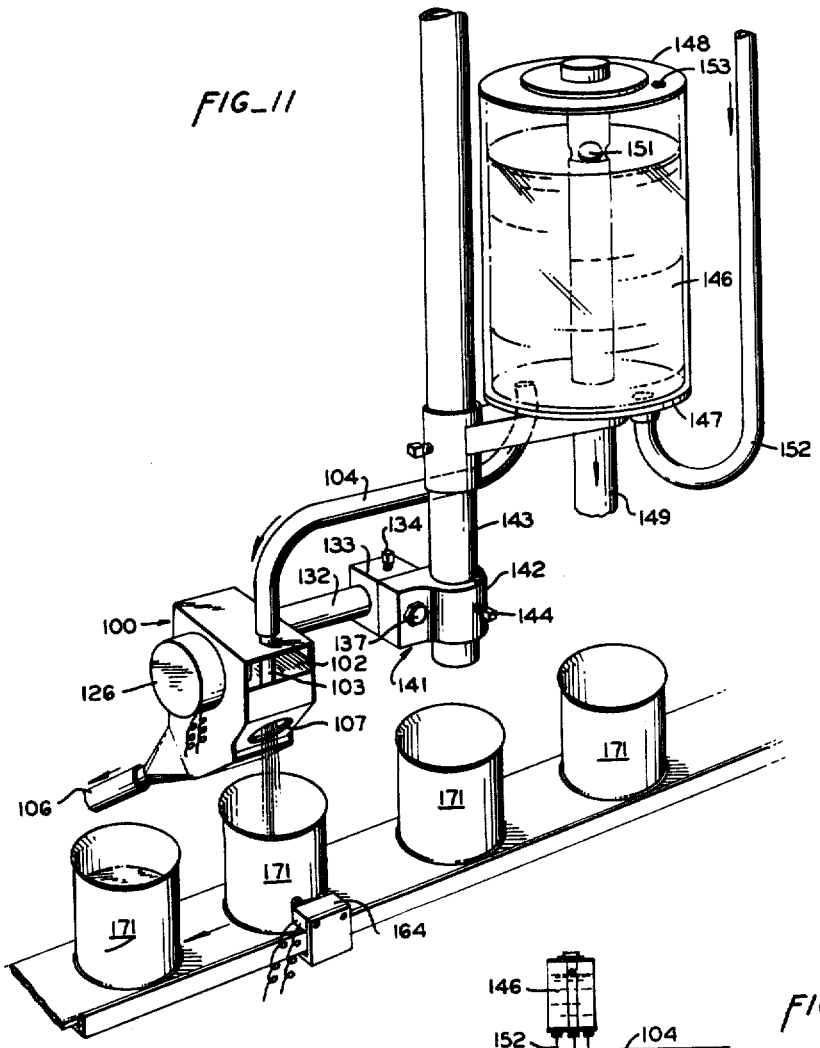
FIGURE 11 illustrates a third method of installing the dispensing head.

Referring to FIGURE 11, the mounting for the dispensing head 100 and its associated pipe 132 and mounting block 133 is by means of a bracket 141 having a sleeve portion 142 adjustably secured on upright pipe 143 by means of a set screw 144. The pipe 143 may be mounted in fixed position in any desired manner.

The liquid supplied through the conduit 104, which in this instance is flexible, is provided by either a constant pressure pump or by a gravity head from a gravity source of supply. In FIGURE 11 the form of the gravity source of supply is of the type described in the co-pending application of J. B. Aldecoa, Serial No. 617,194, filed October 19, 1956, for "Filling Apparatus and Method." This gravity source of supply is in the form of a transparent container 146 having respective bottom and top plates 147 and 148, to which are suitably secured a by-pass discharge pipe 149 having a series of apertures 151 at the desired level of the liquid. The inlet to the container 146 is through a flexible conduit 152 entering the bottom plate 147 through a suitable coupling. The top plate 148 is provided with a breather aperture 153.

Figure 12:
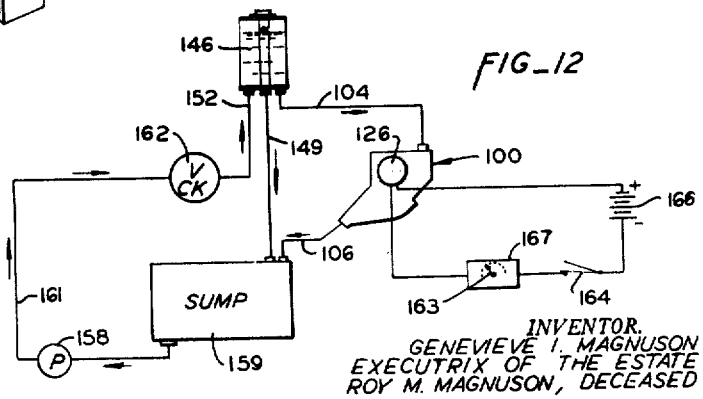
FIGURE 12 is a schematic view illustrating one type of circulating system which can be employed in performing the invention.

The operation of the apparatus in one form is illustrated schematically in FIGURE 12. The system includes a pump 158 having its inlet connected to a sump 159.

The outlet from the pump 158 is connected through a conduit 161 and a check valve 162 to the inlet conduit 152 for the gravity container 146. A constant head gravity flow from the container 146 is provided as described through the conduit 104 to the dispensing head 100. The by-pass discharge pipe 149 is suitably connected to the sump 159, as is also the by-pass return pipe 106 from the head 100.

To control the length of time the discharge gate or interceptor plate 108 is open, the rotary solenoid 126 is electrically connected to a source of potential 166 through a conventional electric timer 167 having an adjusting control 163 for setting the desired time value. A combination starting and no-can no-fill switch 164 (FIGURES 11 and 12) is incorporated in the circuit so that no fill will be made when there is no can present to receive the fill.

One or more of the dispensing heads 100 are provided to place the desired amount of liquid into containers 171 as they pass continually by the dispensing head 100, for example, in FIGURE 9, two dispensing heads 100 are provided, for dispensing measured amounts into the cans 171 carried on a suitable conveyor 172, the timing of the dispensing or filling action being such that separate charges are placed in each container from each of the dispensing heads.

Referring to FIGURE 10, an arrangement is shown where two dispensing heads 100 are placed on opposite sides of the conveyor 172 and discharged simultaneously into a can 171. It will be noted that in FIGURE 10 the angularity of mounting of the heads 100 is different from the angularity necessary in FIGURE 9.

Figure 13:
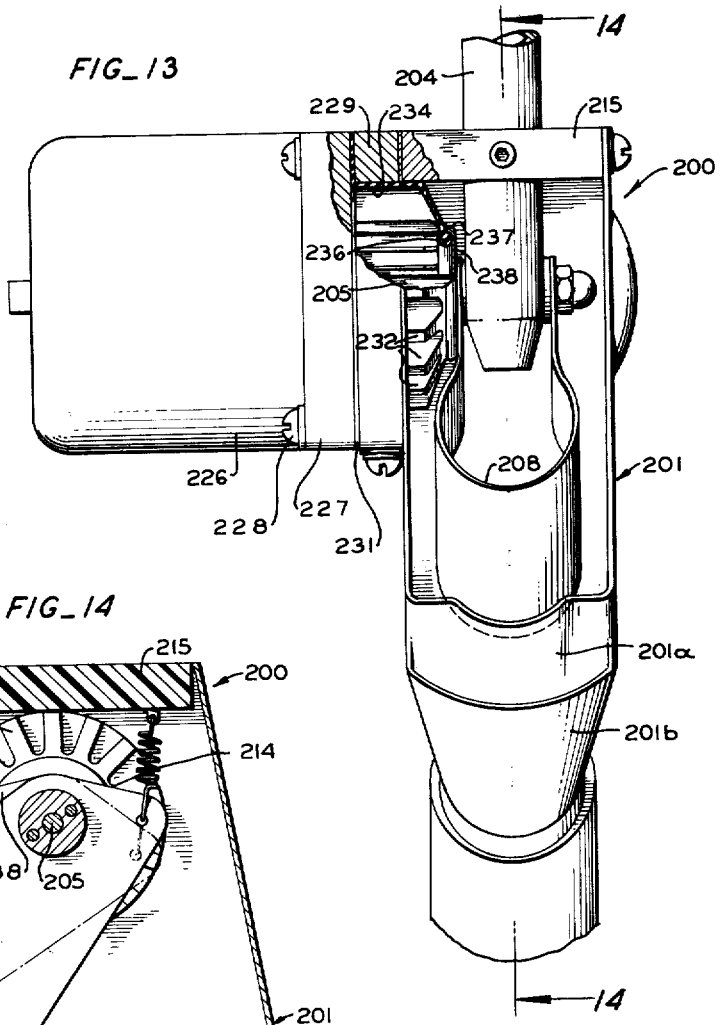
FIGURE 13 is an elevational view of a further modified form of a dispensing or filling head.
Figure 14:
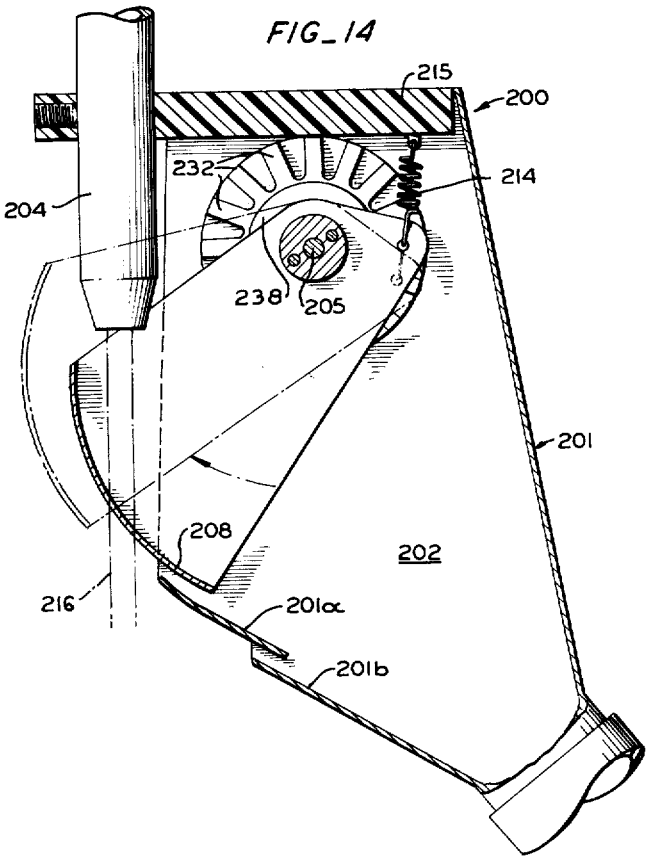
FIGURE 14 is a sectional view partially in elevation and is taken in a plane indicated by the line 14—14 in FIGURE 13.

Referring to FIGURES 13 and 14, another form of the invention is shown for placing of a measured amount of liquid into a container as described in connection with FIGURES 7 and 8, for example. A dispensing head 200 (FIGURES 13 and 14) is shown including a sheet metal housing 201 providing a chamber 202 into which liquid is diverted or introduced by an interceptor gate or cut-off plate 208 from a pipe 204. The housing 201 has an offset wall or plate 201a which overlies an adjacent bottom portion 201b for the direction of liquid in the circulating path. The interceptor or gate 208 is generally U-shaped as described in connection with the interceptor 108 and is actuated by a shaft 205 from a rotary solenoid 226, being returned to the position shown in FIGURE 14 by a spring 214 tensioned between the interceptor 214 and an upper mounting plate 215 which also carries the housing 201 and the pipe 204. The solenoid 226 is of the type disclosed in the co-pending application of Traver J. Smith and Ralph K. Daugherty, Serial No. 669,794, filed July 3, 1957.

The solenoid 226 has a base portion 227 secured by screws 228 to partition means 229 suitably secured to the side wall of the housing 201. The partition means 228 and the adjacent wall of the housing 201 are apertured to receive a resilient shaft seal member of rubber or the like and having an outer flange 231 secured between the base 227 and the plate 229. From this outer flange or sheet portion 231 there projects a circular array of radially directed hollow ribs 232 which extends outwardly from a circular portion or wall 234 provided with an annular rib 236 which is circular in cross section. This rib 236 seats within and is adhesively bonded to an annular rim 237 of a plate 238 secured to the interceptor gate 208 and to the shaft 205. It will be seen that the spaced apart radial ribs 232 provide for a twisting flexing action of the rubber seal member with a minimum resistance to movement of the shaft 205 and a minimum distortion of the seal member itself.

The home position of the interceptor 208 is determined by a stop built into the rotary solenoid structure 226, and is the full line position thereof shown in FIGURE 14. When the solenoid is energized the interceptor 208 is moved rapidly from its full line position to the dotted line position where the stream 216 from the pipe 204 is free to descend into a container, the amount depending upon the length of time the interceptor 208 is in its open position. It will be noted that the action of the gate in moving from its open to its closed position tends to deflect any liquid spray caused by entering the stream 216 toward and into the housing 202 so as to reduce loss of liquid from the system.

While I have shown and described certain preferred apparatus embodying the invention, it will be apparent that the apparatus is capable of modification and variation from the form shown.

I claim:

1. In an apparatus for treating a product with a given amount of a liquid, a product support, a spray head adjacent said support including a nozzle structure having a liquid flow conducting duct providing wall means to completely enclose and conduct liquid under substantially constant super atmospheric pressure and speed to give a substantially constant rate of pressurized liquid flow within said duct, said nozzle structure having means at one end thereof for connecting said duct to a substantially constant super atmospheric pressure source of liquid and an outlet at the other end thereof directed toward said support for forming a free unconfined spray, a chamber for receiving said flow, means beyond said outlet for directing spray from the nozzle structure to the chamber, and means for shifting said directing means out of said spray whereby a spray is delivered from the spray head to products on said support.

2. In an apparatus for treating a product with a given amount of liquid, a product support, a spray head adjacent said support including a center support plate carrying a pair of housing members on opposite sides thereof, said spray head also including a nozzle structure carried by said plate and having an outlet directed toward said support to form a free unconfined spray beyond said outlet, one of said housings providing a chamber adjacent said nozzle structure and having an opening adjacent said nozzle structure, deflector means movably mounted in said one housing and normally disposed beyond said outlet in the path of the spray from said nozzle structure to deliver the spray into the chamber, and means for moving said deflector means out of the path of the spray comprising a rotary solenoid mounted in the other said housings and connected to said deflector means.

3. In an apparatus for treating a product with a given amount of liquid, a product support, a spray head adjacent said support including a center support plate carrying a pair of housing members on opposite sides thereof, said spray head also including a nozzle structure carried by said plate and directed toward said support, one of said housings providing a chamber adjacent said nozzle structure and having an opening adjacent said nozzle structure, deflector means in said one housing and normally disposed in the path of the spray from said nozzle structure to deliver the spray into the chamber, a shaft connected to said deflector means and extending through said plate into the other of said housings, a bearing in said plate for said shaft, means for moving said deflector means out of the path of the spray comprising a rotary solenoid mounted in the other said housings and connected to said shaft, and a flexible seal disposed about said shaft within said one housing.

4. In an apparatus for treating a product with a given amount of liquid, a product support, a spray head adjacent said support including a nozzle structure for forming a free unconfined spray directed toward said support, a chamber, means beyond the outlet of said nozzle structure for intercepting spray from the nozzle structure and delivering it to the chamber, comprising an arcuate spray intercepting plate pivotably mounted in said chamber and disposed to deliver the intercepted spray into said chamber, and means for moving said plate out of the path of the spray.

5. In an apparatus for treating a product with a given amount of liquid as recited in claim 4 in which the intercepting plate is provided with a knife-edge cut-off.

6. In an apparatus for dispensing a given amount of liquid into a container, means for providing a circulating liquid flow of substantially constant volume and traveling at a substantially constant speed at one portion of its path, including a dispensing head having a liquid flow conducting duct providing wall means to completely enclose and conduct liquid under substantially constant superatmospheric pressure and speed to give a substantially constant rate of pressurized liquid flow within said duct, said duct having means at one end thereof for connecting said duct to a substantially constant superatmospheric pressure source of liquid and a nozzle outlet at the other end thereof for forming a free unconfined stream of the liquid at said one path portion, interceptor means disposed beyond said nozzle outlet to intercept said stream and divert it to remain in its circulating path, and means for effecting relative movement between said interceptor means and said nozzle outlet to enable escape of the stream from the path for a selected time interval.

7. In an apparatus for dispensing selected amounts of liquid, a spray head including a housing and a nozzle structure for forming a free unconfined stream of liquid, said housing having an opening to permit escape of the liquid stream from said housing, deflector means movably mounted in said housing and normally disposed beyond the outlet of said nozzle structure in the path of the liquid stream from said nozzle structure to retain the liquid in the housing, and means for moving said deflector means out of the path of the liquid stream comprising a rotary solenoid carried by said spray head and connected to said deflector means.

8. In an apparatus for dispensing a given amount of liquid, a dispensing head including a nozzle structure having a liquid flow conducting duct providing wall means to completely enclose and conduct liquid under substantially constant superatmospheric pressure and speed to give a substantially constant rate of pressurized liquid flow within said duct, said nozzle structure having means at one end thereof for connecting said duct to a substantially constant superatmospheric pressure source of liquid and an outlet at the other end thereof for forming a free unconfined stream of liquid and also providing a chamber for receiving said flow and having an opening adjacent said nozzle structure, deflector means normally disposed beyond the outlet of said nozzle structure in the path of the liquid from said nozzle structure to deliver the liquid into the chamber, means for moving said deflector means out of the path of the liquid and away from said chamber, and means for subsequently returning said deflector means toward said chamber and into the path of the liquid to cause any stray drops caused by said return movement to be directed into said chamber.

9. In an apparatus for dispensing selected amounts of liquid, a dispensing head including a housing and a nozzle structure for forming a liquid stream, said housing having an opening to permit escape of the liquid stream from said housing, deflector means movably mounted on said head and normally disposed in the path of the liquid from said nozzle structure to retain the liquid in the housing, and means for moving said deflector means out of the path of the liquid stream comprising a rotary solenoid carried by said spray head and connected to said deflector means, partition means separating said rotary solenoid from said liquid in said housing and a resilient seal member connected to said partition means and to said deflector means, said seal member having a circular array of radially disposed ribs to provide for distortion of said seal member during operation of said solenoid.

10. In an apparatus for dispensing selected amounts of liquid, a dispensing head including a housing and a nozzle structure for forming a liquid stream, said housing having an opening to permit escape of the liquid stream from said housing, deflector means movably mounted on said head and normally disposed in the path of the liquid from said nozzle structure to retain the liquid in the housing, and means for moving said deflector means out of the path of the liquid stream comprising a rotary solenoid carried by said spray head and connected to said deflector means, partition means separating said rotary solenoid from said liquid in said housing and a resilient seal member connected to said partition means at one side thereof and to said deflector means at the other side thereof, said seal member having a circular array of radially disposed hollow ribs between said sides to provide for distortion of said seal member during operation of said solenoid.

11. In an apparatus for dispensing selected amounts of liquid, a dispensing head including a housing and a nozzle structure, said housing having an opening to permit escape of the liquid stream from said housing, deflector means movably mounted on said head and normally disposed in the path of the liquid from said nozzle structure to retain the liquid in the housing, and means for moving said deflector means out of the path of the liquid stream comprising electrical operating means carried by said head and connected to said deflector means, partition means separating said operating means from said liquid in said housing and, a resilient seal member connected to said partition means and to said deflector means, said seal member having a circular array of radially disposed ribs to provide for distortion of said seal member without causing damaging flexing thereof.

12. In an apparatus for dispensing selected amounts of liquid, a pair of dispensing heads each including a housing and a nozzle structure, each housing having an opening in alignment with the discharge end of its associated nozzle structure and also having a liquid return outlet, deflector means movably mounted on each housing beyond the discharge end of its associated nozzle structure for movement between a first position to direct the liquid from said nozzle structure through said outlet and a second position permitting liquid flow from said nozzle structure through said opening, means providing a liquid flow in a circulating path including two portions, each portion including one of said nozzle structures and providing at said nozzle structure a free unconfined stream of substantially constant volume and traveling at a substantially constant speed, said nozzle structures being mounted in opposed direction to direct the respective streams therefrom to a point of impingement, and means for operating the deflector means of both said dispensing heads simultaneously.

13. In an apparatus for dispensing volumetrically a given amount of liquid into a container, means for providing a circulating liquid flow of substantially constant volume and traveling at substantially constant speed in one portion of its path, said flow providing means including a source providing liquid at a constant pressure, a conduit leading from said source, and a dispensing head to receive liquid from said conduit having a liquid flow conducting duct providing wall means to completely enclose and conduct liquid under substantially constant superatmospheric pressure and speed to give a substantially constant rate of pressurized liquid flow within said duct, the filling of said conduit with liquid from said source providing said flow of substantially constant volume traveling at a substantially constant speed, said dispensing head including a nozzle outlet at one end of said duct for forming a free unconfined stream of liquid at said one path portion and means at the other end of said duct for connecting said duct to said conduit, interceptor means disposed beyond said nozzle outlet to intercept said stream and divert it as a whole to remain in its circulating path, and means for effecting rapid relative movement between said interceptor means and said nozzle outlet to enable escape of the whole of said stream from the path to deliver volumetrically a measured amount to a container.

14. In an apparatus for dispensing a given amount of liquid into a container, means for providing a circulating liquid flow of substantially constant volume and traveling at a substantially constant speed at one portion of its path, including a dispensing head having a nozzle outlet for forming a free unconfined stream of the liquid at said one path portion, intercepting means normally disposed beyond said nozzle outlet to be active with respect to said stream to divert it to remain in its circulating path, means for rendering said intercepting means inactive, and thereby providing for escape of the stream from the path for a selected time interval, and container responsive electrical means for controlling the time interval during which said intercepting means is rendered inactive.

*15. In an apparatus for dispensing a given amount of liquid into containers moving successively to and from a dispensing station, means for providing a circulating liquid flow of substantially constant volume and traveling at a substantially constant speed at one portion of its path, including a dispensing head positioned adjacent said dispensing station having a liquid flow conducting duct providing wall means to completely enclose and conduct liquid under substantially constant super-atmospheric pressure and speed to give a substantially constant rate of pressurized liquid flow within said duct, said duct having means at one end thereof for connecting said duct to a substantially constant super-atmospheric pressure source of liquid and a nozzle outlet at the other end thereof for forming a free unconfined stream of the liquid at said one path portion which may be directed toward a container at said dispensing station, interceptor means disposed beyond said nozzle outlet to intercept said stream and divert it to remain in its circulating path, and means for effecting relative movement between said interceptor means and said nozzle outlet to enable escape of the stream from the path for a selected time interval directly into a container at said dispensing station.*

*16. In an apparatus for dispensing a given amount of liquid into containers moving successively to and from a dispensing station, means for providing a circulating liquid flow of substantially constant volume and traveling at a substantially constant speed at one portion of its path, including a dispensing head positioned adjacent said dispensing station having a liquid flow conducting duct providing wall means to completely enclose and conduct liquid under substantially constant super-atmospheric pressure and speed to give a substantially constant rate of pressurized liquid flow within said duct, said duct having means at one end thereof for connecting said duct to a substantially constant super-atmospheric pressure source of liquid and a nozzle outlet at the other end thereof for forming a free unconfined stream of the liquid at said one path portion which may be directed toward a container at said dispensing station, interceptor means disposed beyond said nozzle outlet to intercept said stream and divert it to remain in its circulating path, means including a rotary solenoid responsive to the positioning of a container at said dispensing station for effecting rapid relative movement between said interceptor means and said nozzle outlet to enable escape of the stream from the path for a selected time interval directly into a container at said dispensing station.*

*17. In an apparatus for dispensing a given amount of liquid into containers moving successively to and from a dispensing station, means for providing a circulating liquid flow of substantially constant volume and traveling at a substantially constant speed at one portion of its path including a source providing liquid at a constant pressure, a conduit leading from said source, and a dispensing head positioned adjacent said dispensing station having a liquid flow conducting duct providing wall means to completely enclose and conduct liquid under substantially constant super-atmospheric pressure and speed to give a substan-*

*tially constant rate of pressurized liquid flow within said duct, said duct having means at one end of connection to said conduit and a nozzle outlet at the other end thereof for forming a free unconfined stream of the liquid at said one path portion which may be directed toward a container at said dispensing station, interceptor means disposed beyond said nozzle outlet to intercept said stream and divert it to remain in its circulating path, and means responsive to the positioning of a container at said dispensing station for effecting rapid relative movement between said interceptor means and said nozzle outlet to enable escape of the stream from the path for a selected time interval to deliver volumetrically a measured amount of liquid from said nozzle directly into a container positioned at said dispensing station.*

*18. In an apparatus for dispensing a given amount of liquid into containers moving successively to and from a dispensing station, means for providing a circulating liquid flow of substantially constant volume and traveling at a substantially constant speed at one portion of its path including a source providing liquid at a constant pressure, a conduit leading from said source, and a dispensing head positioned adjacent said dispensing station having a liquid flow conducting duct providing wall means to completely enclose and conduct liquid under substantially constant super-atmospheric pressure and speed to give a substantially constant rate of pressurized liquid flow within said duct, said duct having means at one end for connection to said conduit and a nozzle outlet at the other end thereof for forming a free unconfined stream of the liquid at said one path portion, interceptor means disposed beyond said nozzle outlet, said nozzle outlet and said interceptor means being relatively movable from one relative position in which said interceptor means intercepts said stream and diverts it to remain in its closed path to another relative position in which said interceptor means is ineffective to divert said stream and said free unconfined stream passes directly into a container positioned at said dispensing station, means tending to maintain said nozzle outlet and interceptor means in intercepting position, means for effecting rapid relative movement between said nozzle outlet and said interceptor means from intercepting to dispensing position and means for controlling the time interval during which said interceptor means is rendered ineffective.*

*19. In an apparatus for dispensing a given amount of liquid into containers moving successively to and from a dispensing station, means for providing a circulating liquid flow substantially constant volume and traveling at a substantially constant speed at one portion of its path including a source providing liquid at a constant pressure, a conduit leading from said source, and a dispensing head positioned adjacent said dispensing station having a liquid flow conducting duct providing wall means to completely enclose and conduct liquid under substantially constant super-atmospheric pressure and speed to give a substantially constant rate of pressurized liquid flow within said duct, said duct having means at one end for connection to said conduit and a nozzle outlet at the other end thereof for forming a free unconfined stream of the liquid at said one path portion, interceptor means disposed beyond said nozzle outlet, said nozzle outlet and said interceptor means being relatively movable from one relative position in which said interceptor means intercepts said stream and diverts it to remain in its closed path to another relative position in which said interceptor means is ineffectve to divert said stream and said free unconfined stream passes directly into a container positioned at said dispensing station, means tending to maintain said nozzle outlet and interceptor means in intercepting position and container responsive electrically actuated means for effecting rapid relative movement between said nozzle outlet and said interceptor means from intercepting to dispensing position and controlling the time interval during which said interceptor means is rendered ineffective.*

References Cited in the file of this patent or the original patent

UNITED STATES PATENTS

| | | |
|---|---|---|
| 643,102 | Bates | Feb. 13, 1900 |
| 1,082,287 | Schaffer et al. | Dec. 23, 1913 |
| 1,726,135 | Ames | Aug. 27, 1929 |
| 1,733,111 | Ames | Oct. 29, 1929 |
| 2,174,539 | Sutton | Oct. 3, 1939 |
| 2,182,378 | Gunn | Dec. 5, 1939 |
| 2,392,054 | McKinnis | Jan. 1, 1946 |
| 2,522,249 | Baker | Sept. 12, 1950 |
| 2,603,398 | Fischer et al. | July 15, 1952 |
| 2,625,952 | Eide et al. | Jan. 20, 1953 |
| 2,789,589 | Fechheimer | Apr. 23, 1957 |